(12) United States Patent
Suzuki et al.

(10) Patent No.: US 8,556,566 B1
(45) Date of Patent: Oct. 15, 2013

(54) DISK STACKING METHOD AND APPARATUS

(75) Inventors: Shoji Suzuki, San Jose, CA (US); David A. Throckmorton, San Jose, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 13/251,145

(22) Filed: Sep. 30, 2011

(51) Int. Cl.
*B65H 57/00* (2006.01)
*B65H 31/30* (2006.01)
*B65G 57/00* (2006.01)

(52) U.S. Cl.
USPC ............... 414/789.1; 414/935; 414/788.9; 414/790.2; 414/791.5; 271/221

(58) Field of Classification Search
USPC .......... 414/789.1, 788.9, 791.5, 789.9, 790.2, 414/935; 271/221
See application file for complete search history.

(56) References Cited

U.S. PATENT DOCUMENTS

| | | | |
|---|---|---|---|
| 4,616,821 A * | 10/1986 | Boeve et al. | 271/213 |
| 4,929,073 A * | 5/1990 | La Plante et al. | 359/848 |
| 5,310,306 A * | 5/1994 | Lunghi | 414/788 |
| 5,882,243 A * | 3/1999 | Das et al. | 451/5 |
| 6,280,294 B1 | 8/2001 | Miyamoto | |
| 6,558,109 B2 * | 5/2003 | Gibbel | 414/795.5 |
| 6,615,613 B1 | 9/2003 | Iwabuchi et al. | |
| 6,643,907 B2 * | 11/2003 | Hagiwara et al. | 29/433 |
| 6,692,219 B2 * | 2/2004 | Coomer et al. | 414/754 |
| 6,709,545 B2 * | 3/2004 | Iida | 156/345.31 |
| 7,114,908 B1 * | 10/2006 | Sarver et al. | 414/790.2 |
| 7,175,511 B2 * | 2/2007 | Ueda et al. | 451/63 |
| 7,637,713 B1 * | 12/2009 | Parette | 414/795.5 |
| 7,684,152 B2 * | 3/2010 | Suzuki et al. | 360/135 |
| 7,837,536 B2 * | 11/2010 | Haneda et al. | 451/41 |
| 7,963,735 B2 * | 6/2011 | Jang et al. | 414/185 |
| 2004/0047720 A1 * | 3/2004 | Lerner | 414/781 |
| 2004/0070141 A1 * | 4/2004 | Michels et al. | 271/220 |
| 2006/0222481 A1 * | 10/2006 | Foree | 414/800 |
| 2007/0254561 A1 | 11/2007 | Aida et al. | |
| 2008/0176489 A1 | 7/2008 | Haneda et al. | |
| 2008/0279657 A1 * | 11/2008 | Liu et al. | 414/222.01 |
| 2010/0119347 A1 * | 5/2010 | Malenke et al. | 414/789 |
| 2011/0000882 A1 * | 1/2011 | Foote et al. | 216/67 |
| 2012/0082538 A1 * | 4/2012 | Greber et al. | 414/802 |

FOREIGN PATENT DOCUMENTS

| | | |
|---|---|---|
| JP | 11033886 A | 2/1999 |
| JP | 2004155652 A | 6/2004 |

* cited by examiner

*Primary Examiner* — Gregory Adams
*Assistant Examiner* — Lynn Schwenning (57) ABSTRACT

Aspects of embodiments of the present invention are directed toward a method of stacking disk-shaped substrates for polishing without using a centering shaft and an apparatus for implementing the method. A stack of disk-shaped substrates can be concentrically aligned without contacting the inside circumferential surfaces of the disk-shaped substrates by applying pressure to the outside edges of the disk-shaped substrates in different lateral directions.

30 Claims, 6 Drawing Sheets

DISK STACKING METHOD AND APPARATUS

BACKGROUND

1. Field

Aspects of embodiments according to the present invention are directed toward a method of stacking disk-shaped substrates and an apparatus for implementing the method.

2. Description of Related Art

Numerous situations to assemble disk-shaped substrates, such as a disk platter for a magnetic hard drive, as a stack appear in glass substrate manufacturing processes. For example, a magnetic hard drive stores data on a disk platter including one or more concentrically arranged disk-shaped substrates. Each of the disk-shaped substrates has a hole at the center and may be a glass substrate. In general, a disk-shaped substrate has predetermined outside diameter (OD) and inside diameter (ID) (i.e., diameter of the hole). During manufacturing of the glass substrate, the inside circumferential surface of the hole is polished to the desired smoothness. Similarly, the outside circumferential surface of the substrate is polished.

In the related art, a number of disk-shaped substrates are stacked in a concentric manner to form a stack or column such that the inner circumferential surfaces of the disk-shaped substrates can be polished together to save time and costs. A typical method to assemble a stack of disk-shaped substrates uses a centering shaft or a guide shaft that has a tight tolerance relative to the ID of the disk-shaped substrate. Although the centering shaft can maintain the concentricity of the disk-shaped substrates, the use of the centering shaft may cause damage to the inside circumferential surfaces (e.g., edges) of the disk-shaped glass substrates. Therefore, it is desirable to provide an improved method of stacking and aligning disk-shaped substrates while avoiding damage to the inside circumferential surfaces of the substrates, and it is also desirable to provide an apparatus to practice the improved method.

SUMMARY

Aspects of embodiments according to the present invention are directed toward a method of stacking and aligning disk-shaped substrates, and an apparatus for performing the method.

Aspects of embodiments according to the present invention are directed toward aligning a stack of disk-shaped substrates having the same outside diameter without using a centering shaft or guide shaft such that damage to the inside circumferential surfaces of holes of the substrates can be avoided.

According to an embodiment of the present invention a method for stacking and aligning disk-shaped substrates is provided. The method includes stacking a plurality of disk-shaped substrates having about the same outside diameter to form a stack, each of the disk-shaped substrates having a hole at a center portion thereof, and pressure is applied to outside edges of one or more of the disk-shaped substrates in at least one lateral direction of the stack to concentrically align the holes of the disk-shaped substrates.

The pressure applied to the outside edges of the one or more disk-shaped substrates may be applied in at least three lateral directions of the stack to align the outside edges of the disk-shaped substrates in an axial direction of the stack.

The method may further include applying a gas stream toward a lateral side of the stack. The gas stream may move in an axial direction of the stack. The gas stream may include a gas selected from the group consisting of air, oxygen, nitrogen, and a combination thereof.

The method may further include placing the plurality of disk-shaped substrates in a carrier including a first support member and a second support member, and fixing the relative positions of the disk-shaped substrates between the first support member and the second support member by friction.

The method may further include placing a spacer between adjacent substrates of the disk-shaped substrates.

The method may further include positioning the carrier at a non-zero angle relative to a level direction while the plurality of disk-shaped substrates are placed in the carrier.

The application of pressure to the edges of one or more of the disk-shaped substrates includes applying pressure in at least three lateral directions of the stack using at least two alignment members, respectively.

The method may further include moving at least one of the at least two alignment members toward the other one of the at least two alignment members to reduce a diameter of an area enclosed by the at least two alignment members to be about equal to the outside diameter of the disk-shaped substrates. One of the at least two alignment members may have a partially cylindrical surface corresponding to the outside diameter of the disk-shaped substrates.

The method may further include shaping the disk-shaped substrates individually to have about the same outside diameter.

The holes of the disk-shaped substrates may be concentrically aligned without using a centering shaft or guide shaft.

The method may further include polishing the inside circumferential edges of the holes of the disk-shaped substrates after the holes are concentrically aligned.

According to another embodiment of the present invention, an apparatus for stacking and aligning disk-shaped substrates is provided. The apparatus includes a first edge guide and a second edge guide. The first edge guide is configured to apply pressure to outside edges of one or more of disk-shaped substrates arranged in a stack in a first lateral direction of the stack, the one or more disk-shaped substrates each having a hole at a center portion thereof. The second edge guide is configured to apply pressure to the outside edges of the one or more disk-shaped substrates in a second lateral direction of the stack. The first edge guide is configured to be movable toward the second edge guide to apply pressure to the outside edges of the disk-shaped substrates from at least three lateral sides of the stack to concentrically align the holes of the disk-shaped substrates.

At least one of the first edge guide or the second edge guide may have a partially cylindrical surface corresponding to outside diameters of the disk-shaped substrates.

The first edge guide and the second edge guide may be spatially adjustable to be positioned at a non-zero angle relative to a level direction.

The apparatus may further include a carrier configured to retain the stack of disk-shaped substrates between the first edge guide and the second edge guide.

The carrier may include a first support member and a second support member spaced from the first support member for removably retaining the stack of disk-shaped substrates therebetween. The carrier may further include at least one connecting member connected between the first support member and the second support member, the connecting member extending in an axial direction of the stack.

The apparatus may further include a frame for supporting the first edge guide and the second edge guide, wherein at least one of the first edge guide or the second edge guide may be movably coupled to the frame.

The apparatus may further include a guiding member on the frame for guiding a movable one of the first edge guide and the second edge guide toward a fixed one of the first edge guide and the second edge guide.

The apparatus may further include a spacer between adjacent substrates of the disk-shaped substrates.

The apparatus may further include a nozzle for supplying a gas stream toward the lateral side of the stack of the disk-shaped substrates. The nozzle may be movable along an axial direction of the stack.

The disk-shaped substrates may be glass substrates. The disk-shaped substrates may be configured as a disk platter in a data storage device.

BRIEF DESCRIPTION OF THE DRAWINGS

The above and other features and aspects of the present invention will become more apparent by describing in detail exemplary embodiments thereof with reference to the attached drawings.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof that are disclosed in the specification, and are not intended to preclude the possibility that one or more other features, numbers, steps, actions, components, parts, or combinations thereof may exist or may be added.

The shapes and sizes of the various elements shown in the drawings may be exaggerated for ease of illustration, and the present invention is not limited thereto.

Figure 1A:
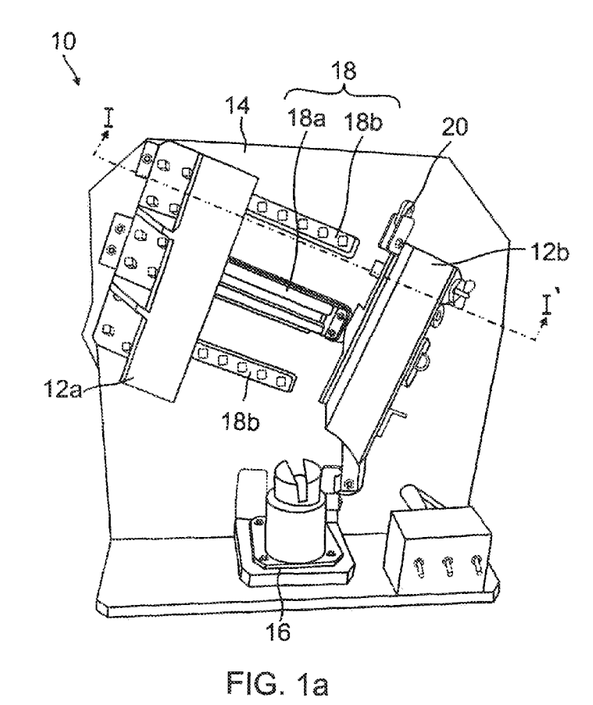
FIG. 1a is a front perspective view of an apparatus for stacking and aligning disk-shaped substrates according to an embodiment of the present invention.
Figure 1B:
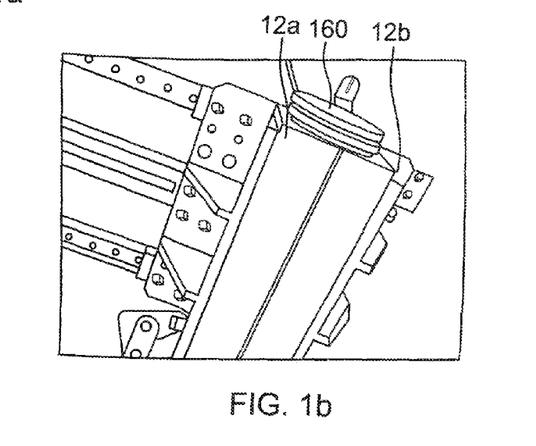
FIG. 1b is an expanded front perspective view of a portion of the apparatus of FIG. 1 in a closed position according to an embodiment of the present invention.
Figure 1C:
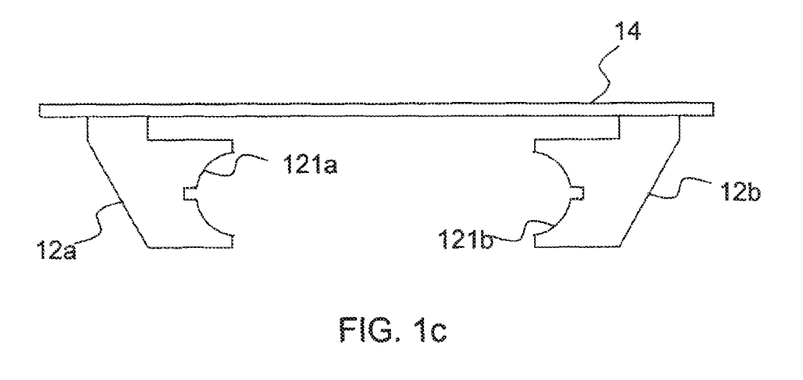
FIG. 1c is a top cross-sectional view of the apparatus of FIG. 1.

FIG. 1a is a front perspective view of an apparatus 10 for stacking and aligning disk-shaped substrates according to an embodiment of the present invention. FIG. 1b is an expanded front perspective view of a portion of the apparatus 10 of FIG. 1a in a closed position according to an embodiment of the present invention. FIG. 1c is a top cross-sectional view of the apparatus of FIG. 1a along the line I-I'.

Referring to FIGS. 1a-1c, the apparatus 10 for stacking and aligning disk-shaped substrates includes a pair of edge guides 12a and 12b mounted on a frame 14. The edge guides 12a and 12b may be made of metal or other suitable materials. The edge guides 12a and 12b may be positioned at a non-zero angle relative to a level direction (e.g., horizontal direction and perpendicular to a direction of gravity) of the frame 14. For example, in several embodiments, the non-zero angle may be between about 20° and 90°. In another embodiment, the angle is between about 0° and about 90°. Placing the edge guides 12a and 12b at the non-zero angle may aid the loading of disk-shaped substrates during setup of the apparatus. However, the present invention is not limited thereto, and the edge guides 12a and 12b may be mounted vertically (e.g., such that there is no angle of inclination therebetween). In an embodiment, the edge guide 12a is movably connected to the frame 14 via a guiding member 18 such that the edge guide 12a is movable in a lateral direction of the edge guides. As such, the distance between the edge guides 12a and 12b may be adjusted by moving the edge guide 12a away or toward the edge guide 12b. When the disk-shaped substrates are positioned as a stack between the edge guides 12a and 12b, one or both of the edge guides 12a and 12b move toward each other and make contact with the edges of the disk-shaped substrates such that the edge guides 12a and 12b apply pressure in a lateral direction of the stack to align the disk-shaped substrates in an axial direction of the stack.

In the embodiment shown in FIG. 1a, the guiding member 18 may include a slotted rail 18a and one or more guide rails 18b respectively located on the sides of the slotted rail 18a. The slotted rail 18a and the guide rails 18b extend between the edge guides 12a and 12b in parallel. In the embodiment illustrated in FIG. 1a, the edge guide 12a is movable and the edge guide 12b is fixed. However, in other embodiments, both edge guides 12a and 12b may be movable, or the edge guide 12b is movable and the edge guide 12a is fixed. In FIG. 1b, the edge guide 12a is positioned adjacent to the edge guide 12b (i.e., closed position). In FIG. 1a, a base unit 16 is located below the edge guides 12a and 12b along a lower portion of the frame 14. The base unit 16 is adapted to support a carrier 160 (e.g., a disk carrier) for retaining a stack of disk-shaped substrates between the edge guides 12a and 12b both before and after alignment of the substrates. The apparatus further includes a nozzle 20 for supplying a gas stream. When the carrier 160 loaded with a stack of disk-shaped substrates is placed between the edge guides 12a and 12b, the nozzle 20 directs a gas stream toward the lateral side of the stack such that friction between adjacent disk-shaped substrates may be reduced to facilitate translational movement of the substrates during alignment. In one embodiment, the nozzle 20 has a diameter of about 2.45 mm, and the gas stream produces a pressure at about 0.4 MPa. In addition, the nozzle 20 may move up and down along the axial direction of the stack. The gas stream may include air, oxygen, nitrogen, and/or a combination thereof.

Figure 2A:
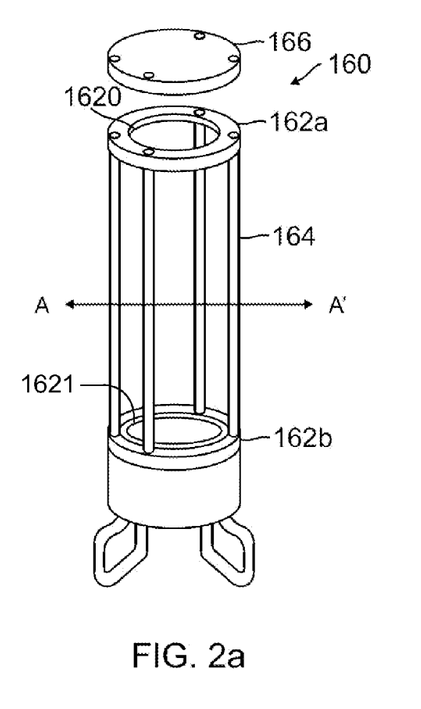
FIG. 2a is a perspective view of a carrier for holding a stack of disk-shaped substrates.
Figure 2B:
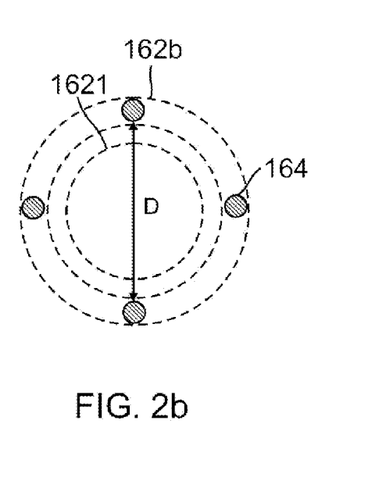
FIG. 2b is a cross-sectional view of the carrier along the line A-A'.

FIG. 2a is a perspective view of the carrier 160 according to an embodiment of the present invention. FIG. 2b is a top cross-sectional view of the carrier 160 along the line A-A'. In FIG. 2a, the carrier 160 includes a first support member 162a and a second support member 162b. Each of the first and second support members 162a and 162b is a disk-shaped member with a predetermined thickness. The carrier 160 is configured by connecting the first support member 162a and the second support member 162b with connecting members 164 (e.g., bars or rods) connected to circumferential portions of the support members 162a and 162b. The first support member 162a has a hole 1620 with a suitable diameter at a center thereof for loading the disk-shaped substrates into a space defined by the first support member 162a, the second support member 162b, and the connecting members 164. The second support member 162b has a hole 1621 with a suitable diameter at a center thereof. An area circumscribed by the connecting members 164 has a diameter (D) equal to or larger than the outside diameter (OD) of the disk-shaped substrates.

Figure 3:
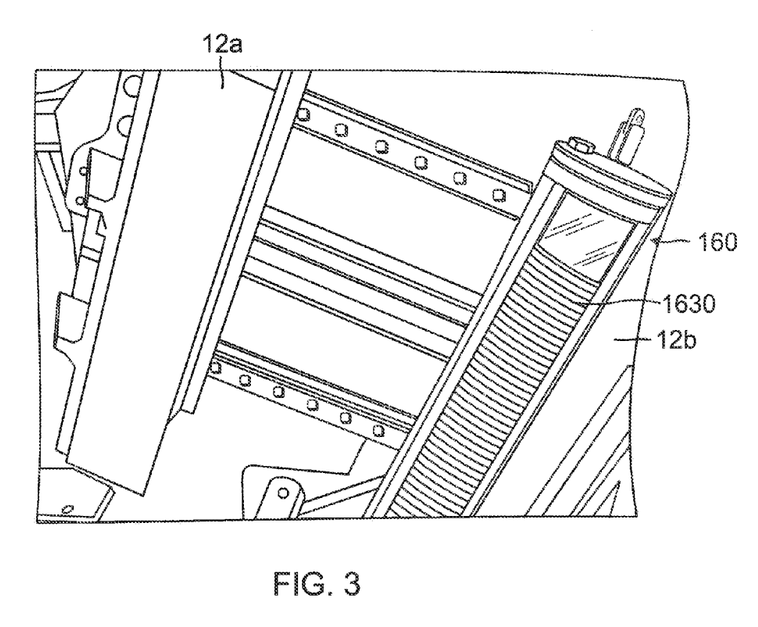
FIG. 3 is a view illustrating a carrier positioned on an edge guide of the apparatus shown in FIG. 1.

The carrier 160 further includes a disk-shaped lid 166 that is removably attached to the first support member 162a to apply pressure to the disk-shaped substrates and thereby secure the relative position of the disk-shaped substrates between the first and second support members 162a and 162b. The lid 166 may be connected to the first support member 162a by a number of bolts or other suitable fastening mechanisms such that the disk-shaped substrates may easily be moved laterally in one setting during an alignment process, and the relative lateral positions of the disk-shaped substrates may be secured by friction when the lid 166 applies pressure to the substrates in another setting after the alignment process. During the alignment process, the carrier 160 is secured to the base unit 16. For example, the carrier 160 may be pivotally supported by the base unit 16 so that the carrier 160 may be inclined on the edge guide 12b. In FIG. 3, the carrier 160 is shown positioned on the edge guide 12b with a stack of disk-shaped substrates 1630 loaded in the carrier 160.

Referring to FIG. 1c, this figure illustrates a top cross-sectional view of the frame 14 and the edge guides 12a and 12b along the line I-I' according to an embodiment of the present invention. Other components of the apparatus 10 are omitted in FIG. 1c for clarity and ease of description. In the embodiment of FIG. 1c, a surface 121a of the edge guide 12a faces toward a surface 121b of the edge guide 12b, and each of the surfaces 121a and 121b has a concave shape (e.g., a partial cylindrical shape). That is, when the edge guide 12a is moved toward and placed proximate to the edge guide 12b (i.e., closed position), the surfaces 121a and 121b define a full cylindrical cavity for enclosing the carrier 160 therein. Each of the surfaces 121a and 121b has a recess portion sized to receive the connecting member 164 of the carrier 160.

When the carrier 160 is held between the edge guides 12a and 12b while the edge guides are at the closed position, the surfaces 121a and 121b apply pressure to the outside edges of the stack of disk-shaped substrates retained in the carrier 160 from different lateral directions of the stack to align the outside edges of the disk-shaped substrates. Since the disk-shaped substrates may have been previously prepared (e.g., by grinding and/or polishing) to have substantially the same OD, the holes or inside openings of the disk-shaped substrates can be concentrically aligned by aligning the outside edges of the disk-shaped substrates as described above using the edge guides 12a and 12b. Accordingly, the disk-shaped substrates are concentrically aligned without the need to insert a centering shaft through the holes of the disk-shaped substrates. Therefore, damage to the inside diameter (ID) of the substrates can be avoided.

While the embodiment of FIG. 1c illustrates that each of the edge guides 12a and 12b has a concave surface, the present invention is not limited thereto. To the contrary, the edge guides 12a and 12b may have other suitable shapes as long as the edge guides 12a and 12b may apply pressure to the outside edges of the disk-shaped substrates in at least three different lateral directions of the stack. In another embodiment, the edge guide 12a may include one edge member for applying pressure to the stack in one lateral direction, and the edge guide 12b may include two edge members for applying pressure to the stack in two other lateral directions. In still another embodiment, the edge guide 12a may include two edge members for applying pressure to the stack in two different lateral directions, and the edge guide 12b may include one edge member for applying pressure to the stack in another lateral direction.

Figure 4:
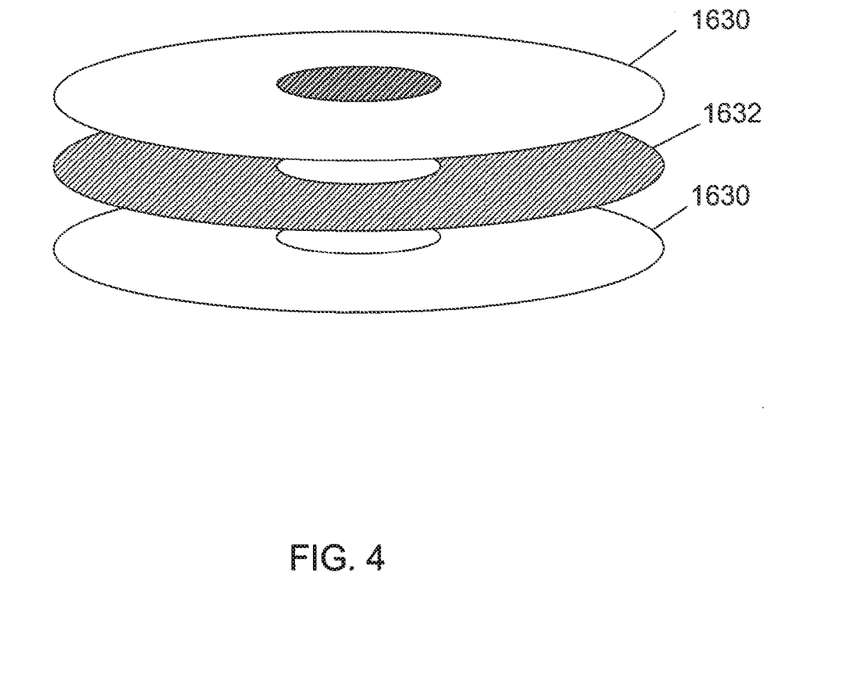
FIG. 4 is a schematic diagram showing a spacer between two disk-shaped substrates.

FIG. 4 is a schematic drawing illustrating two disk-shaped substrates and one spacer. Referring to FIG. 4, in order to facilitate the lateral movement of the disk-shaped substrates 1630 during the alignment process, a spacer 1632 with a predetermined thickness may be placed between two adjacent substrates of the disk-shaped substrates 1630. The spacers can allow bristles of a brush to penetrate and polish the full edge of the disks. In addition, the spacers can prevent or reduce disk to disk contact and damage. The spacers also help to facilitate alignment by allowing the gas jet to penetrate between the disks and reposition the disks for alignment. The spacer 1632 may be made of plastic or other suitable materials. The OD of the spacer 1632 may be equal to or smaller than that of the substrates 1630. After a predetermined number of disk-shaped substrates 1630 are loaded into the carrier 160, the lid 166 is installed on the first support member 162a. If the total height of the stack of disk-shaped substrates is less than the distance between the first and second support members 162a and 162b, additional spacers 1632 or other spacers with suitable thicknesses may be stacked on one or both ends of the stack of disk-shaped substrates to fill up the empty space such that the lid 166 may secure the substrates inside the carrier 160.

Figure 5:
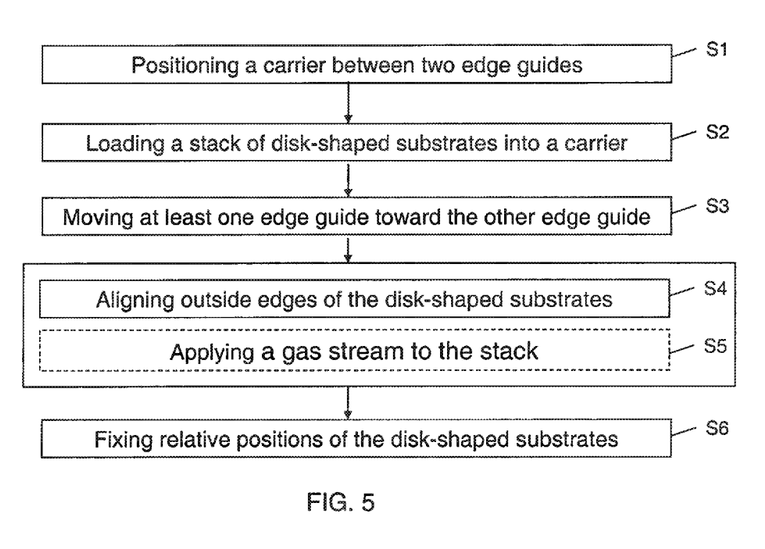
FIG. 5 is a block diagram illustrating a method of stacking and aligning a plurality of disk-shaped substrates according to an embodiment of the present invention.

FIG. 5 is a block diagram illustrating a method of stacking a plurality of disk-shaped substrates. In particular embodiments, the method can be used with the apparatus of FIGS. 1a-1c. In block S1, a carrier for holding a plurality of disk-shaped substrates is positioned between two edge guides of an apparatus according to an embodiment of the present invention. In block S2, the disk-shaped substrates are loaded into the carrier. Here, the carrier may be placed between the edge guides prior to loading the substrates, or the carrier may be loaded with the substrates prior to being positioned between the edge guides. In block S3, at least one of the edge guides is moved toward the other one of the edge guides. At a closed position, the first edge guide and the second edge guide are placed proximate to each other with the carrier enclosed therebetween. In block S4, the edge guides apply pressure to the edges of the disk-shaped substrates in different lateral directions such that the outside edges of the substrates are aligned in the axial direction of the stack. Optionally, in block S5, a gas stream may be applied to the lateral side of the stack to reduce the friction between adjacent substrates to facilitate translational movement. In block S6, after the substrates are concentrically aligned, the relative positions of the disk-shaped substrates are fixed by installing a lid on the carrier. The lid applies pressure to the disk-shaped substrates in the axial direction of the stack. Then, the carrier may be removed from the apparatus, and the concentrically aligned holes of the disk-shaped substrates may be polished in other processes.

According to the embodiments of the present invention, a plurality of disk-shaped substrates are first prepared to have substantially the same outside diameter and inside diameter. For example, the outside edge of each of the disk-shaped substrates is separately ground to have the same outside diameter, and the inside circumferential surface of the hole of each substrate is ground such that the holes have the same inside diameter. Afterward, the disk-shaped substrates are placed into a stack in a concentric manner in the carrier. The holes of the substrates are concentrically aligned without using a centering shaft by aligning the outside edges of the substrates by using the apparatus as described above. The disk-shaped substrates may be glass substrates, and the disk-shaped substrates may be used as a disk platter in a data storage device such as a magnetic hard disk.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A method for stacking and aligning disk-shaped substrates, the method comprising:
   stacking a plurality of disk-shaped substrates having about the same outside diameter to form a stack, each of the disk-shaped substrates having a hole at a center portion thereof; and
   applying, using at least two alignment members, pressure to outside edges of two or more of the disk-shaped substrates in at least one lateral direction of the stack to concentrically align the holes of the disk-shaped substrates,
   wherein one of the at least two alignment members comprises a concave surface configured to receive a portion of each of the disk-shaped substrates.

2. The method of claim 1, wherein the applying pressure to outside edges of the two or more disk-shaped substrates comprises applying pressure in at least three lateral directions of the stack such that the outside edges of the disk-shaped substrates are aligned in an axial direction of the stack.

3. The method of claim 1, further comprising applying a gas stream toward a lateral side of the stack.

4. The method of claim 3, further comprising moving the gas stream in an axial direction of the stack.

5. The method of claim 3, wherein the gas stream comprises a gas selected from the group consisting of air, oxygen, nitrogen, and a combination thereof.

6. The method of claim 1, further comprising:
   placing the plurality of disk-shaped substrates in a carrier comprising a first support member and a second support member; and
   fixing the relative positions of the disk-shaped substrates between the first support member and the second support member by friction.

7. The method of claim 6, further comprising placing a spacer between adjacent substrates of the disk-shaped substrates.

8. The method of claim 7, further comprising positioning the carrier at a non-zero angle relative to a level direction while the plurality of disk-shaped substrates are placed in the carrier.

9. The method of claim 1, further comprising moving at least one of the at least two alignment members toward the other one of the at least two alignment members to reduce a diameter of an area enclosed by the at least two alignment members to be about equal to the outside diameter of the disk-shaped substrates.

10. The method of claim 9, wherein the concave surface has a partially cylindrical opening corresponding to the outside diameter of the disk-shaped substrates.

11. The method of claim 1, further comprising shaping the disk-shaped substrates individually to have about the same outside diameter.

12. The method of claim 1, wherein the holes of the disk-shaped substrates are concentrically aligned without using a centering shaft.

13. The method of claim 1, further comprising polishing the inside circumferential edges of the holes of the disk-shaped substrates after the holes are concentrically aligned.

14. An apparatus for stacking and aligning disk-shaped substrates, comprising:
   a first edge guide configured to apply pressure to outside edges of two or more of disk-shaped substrates arranged in a stack in a first lateral direction of the stack, the two or more disk-shaped substrates each having a hole at a center portion thereof; and
   a second edge guide configured to apply pressure to the outside edges of the two or more disk-shaped substrates in a second lateral direction of the stack,
   wherein the first edge guide is configured to be movable toward the second edge guide to apply pressure to the outside edges of the disk-shaped substrates from at least three lateral sides of the stack to concentrically align the holes of the disk-shaped substrates, and
   wherein one of the first edge guide and the second edge guide comprises a concave surface configured to receive a portion of each of the disk-shaped substrates.

15. The apparatus of claim 14, wherein the concave surface has a partially cylindrical opening corresponding to outside diameters of the disk-shaped substrates.

16. The apparatus of claim 14, wherein the first edge guide and the second edge guide are spatially adjustable to be positioned at a non-zero angle relative to a level direction.

17. The apparatus of claim 14, further comprising a carrier configured to retain the stack of disk-shaped substrates between the first edge guide and the second edge guide.

18. The apparatus of claim 17, wherein the carrier comprises a first support member and a second support member spaced from the first support member for removably retaining the stack of disk-shaped substrates therebetween.

19. The apparatus of claim 18, wherein the carrier further comprises at least one connecting rod connected between the first support member and the second support member.

20. The apparatus of claim 14, further comprising a frame for supporting the first edge guide and the second edge guide, wherein at least one of the first edge guide or the second edge guide is movably coupled to the frame.

21. The apparatus of claim 20, further comprising a guiding member on the frame for guiding a movable one of the first edge guide and the second edge guide toward a fixed one of the first edge guide and the second edge guide.

22. The apparatus of claim 14, further comprising a spacer between adjacent substrates of the disk-shaped substrates.

23. The apparatus of claim 14, further comprising a nozzle for supplying a gas stream toward the lateral side of the stack of the disk-shaped substrates.

24. The apparatus of claim 23, wherein the nozzle is movable along an axial direction of the stack.

25. The apparatus of claim 14, wherein the disk-shaped substrates are glass substrates.

26. The apparatus of claim 14, wherein the disk-shaped substrates are configured to be used as a disk platter in a data storage device.

27. The apparatus of claim 14, wherein each of the first edge guide and the second edge guide comprises a concave surface configured to receive a portion of the disk-shaped substrates.

28. The apparatus of claim 14, further comprising a carrier configured to retain the stack of disk-shaped substrates between the first edge guide and the second edge guide, wherein the carrier comprises a first support member, a second support member, and at least one connecting rod connected between the first support member and the second support member, and wherein the concave surface comprises a recess configured to receive the at least one connecting rod.

29. The method of claim 1, wherein each of the at least two alignment members comprises a concave surface configured to receive a portion of the disk-shaped substrates.

30. The method of claim 1, further comprising:

placing the plurality of disk-shaped substrates in a carrier comprising a first support member, a second support member, and at least one connecting rod connected between the first support member and the second support member, wherein the concave surface comprises a recess configured to receive the at least one connecting rod.

* * * * *